Patented Aug. 15, 1950

2,519,068

UNITED STATES PATENT OFFICE 2,519,068

COATED FABRICS AND PROCESSES OF MAKING SAME

Allan S. Richardson, Jr., Southport, Conn., assignor to E. I. du Pont de Nemours & Company, Wilmington, Del., a corporation of Delaware No Drawing. Application April 24, 1948, Serial No. 23,135

9 Claims. (Cl. 117—76)

This invention relates to fabrics having a coating thereon and more particularly to a method of improving the bond between the coating and the fabric substrate.

Heretofore, fabrics have been coated with a variety of film-forming agents. More recently, many new synthetic resinous materials have been proposed for fabric coatings. McQueen patent, 2,212,786, described a process for the preparation of chlorosulfonated olefin polymers, such as the chlorosulfonation products of normally solid polymers of ethylene or isobutylene. In copending application Serial No. 654,822, filed March 15, 1946, by Richard E. Brooks et al., there is described new and novel compositions for adhering chlorosulfonated ethylene polymer compositions to other surfaces. It has been discovered that still further improvements in bonding such compositions to flexible fabrics can be realized in accordance with the invention described hereinafter.

The primary object of this invention is to provide new and novel compositions which adhere tenaciously to flexible substrates. A further object is to provide improved compositions as an intermediate bonding medium for flexible substrates and chlorosulfonated ethylene polymer compositions. These and other important objects will be readily apparent as the description of the invention proceeds.

The objects of this invention are accomplished by preparing a dispersion, in a volatile organic solvent, comprising chlorosulfonated ethylene polymer and a polymeric lower alkyl ester of acrylic or methacrylic acid, applying it to flexible substrate, and then heating to evaporate the solvent. The alkyl ester is one having the following formula:

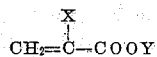

$$CH_2=\overset{X}{\underset{|}{C}}-COOY$$

where Y is an alkyl group of 8 carbon atoms or less and X is an H or $CH_3$ group. A second coating of chlorosulfonated ethylene polymer without the polymeric ester may optionally be applied over the first coating by any suitable method, after which the coated flexible substrate is given a final heat treatment to cure or vulcanize the chlorosulfonated ethylene polymer in both the aforementioned coatings.

The following specific examples are given by the way of illustration and not limitation.

EXAMPLES I TO V

Five compositions represented by Examples I to V, in which the formulae are indicated as parts by weight, were prepared:

*Base coating compositions*

| Example | I | II | III | IV | V |
|---|---|---|---|---|---|
| Chlorosulfonated ethylene polymer | 100 | 100 | 100 | 100 | 100 |
| Polymeric methyl methacrylate | 0 | 20 | 25 | 30 | 40 |
| Hydroquinone mono benzyl ether | 1 | 1 | 1 | 1 | 1 |
| Wood rosin | 4 | 4 | 4 | 4 | 4 |
| Magnesium oxide | 12 | 12 | 12 | 12 | 12 |
| Litharge | 4 | 4 | 4 | 4 | 4 |
| Retarder (Salicylic acid plus a dispersing agent) | 1 | 1 | 1 | 1 | 1 |

The ingredients for each example represented above were milled together in the order listed on a two roll rubber mill. The temperature of the composition was held to a minimum to prevent premature curing of the composition by running cold water through the milling rolls. When the compositions became apparently homogeneous, they were removed from the mill in the form of thick slabs and then broken or cut into small pieces. Each example was thinned with toluene to give a spreading viscosity. About 65% toluol (based on total composition of toluol plus milled composition) was required to give a spreading viscosity.

Two coats of each composition represented by Examples I to V were applied on separate pieces of a 53" woven cotton sateen fabric running 1.12 yards to the pound, which deposited approximately 1.5 ounces of non-volatile coating per square yard. After the toluene was removed by passing through a heated chamber, each fabric was then further coated by calendering an identical composition over the separate base coats containing varying amounts of polymethyl methacrylate. The formula of the calender coat was as follows in parts by weight:

*Calender composition*

| | |
|---|---|
| Chlorosulfonated ethylene polymer | 100.0 |
| Hydroquinone mono benzyl ether | 1.0 |
| Sulfurized oil | 25.0 |
| Wood rosin | 10.0 |
| Polyoxyethylene glycol | 3.0 |
| Fine particle size precipitated calcium carbonate | 80.0 |
| Colored pigments | 12.2 |

The above ingredients were thoroughly masticated on a two roll rubber mill until homogeneous and were then taken from the rolls in the form of slabs and stored for further processing. During the milling operation, the temperature of the composition rose to approximately 200° F. due to internal friction of the mass. After storing, the following materials were added to the slabs on a two roll rubber mill:

| | Parts by weight |
|---|---|
| Magnesium oxide | 12 |
| Litharge | 4 |
| Benzothiazyl disulfide | 1 |

After the above ingredients were milled with the slabs, the mass was heated up to approximately 200° F. to form a plastic mass, which was transferred to heated calender rolls, where it was calendered onto the above-described base coated fabrics. Approximately ten ounces per square yard were applied in one application to each of the above-described base coated fabrics.

The calender coating compositions released from the rolls of the two roll mixing mill and the calender rolls without any tendency to adhere to the heated rolls. The polyoxyethylene glycol employed in the above formula is a translucent waxy solid having an average molecular weight of 3000 to 3700, and contributed to the good release of the calender composition from the heated metal rolls.

The above-described coated fabrics may be processed further by graining or embossing, which is accomplished by passing the coated fabric between heated pressure rolls, one of which has a design engraved on the surface. Heated pressure plates may also be employed for the embossing operation. The coated fabrics may be further decorated if desired by applying a dilute toluene dispersion of a composition similar to the calender coating composition containing pigments of contrasting color or lustre. The finishing composition is deposited in the valleys of depressed areas of the embossed design and wiped off the raised portion. As a final manufacturing operation, the coated fabrics were subjected to a temperature of 260° F. for two hours to cure or vulcanize both the base coating composition and the calender coating composition as well as any finishing composition that may be employed.

The samples containing the different base coats as represented by Examples I to V were tested after the final heat treatment for mechanical scrub resistance and anchorage of coating to the fabric. The results were as follows:

*Control*

| Example | I | II | III | IV | V |
|---|---|---|---|---|---|
| Parts of methyl methacrylate polymer to 100 parts of chlorosulfonated ethylene polymer | 0 | 20 | 25 | 30 | 40 |
| Adhesion of coating to fabric (1" strip) lbs | 3.4 | 4.0 | 5.6 | 4.2 | 4.2 |
| Mechanical scrub resistance | 3,100 | 6,000 | >10,000 | 6,000 | 5,000 |

The adhesion test was carried out in accordance with the procedure described in A. S. T. M. Tentative Method of Testing Rubber Coated Fabrics (A. S. T. M. Designation D751–43T).

A suitable testing apparatus for carrying out the mechanical scrub test is described in "Rubber Age," 61, No. 2, page 232, May (1947).

The chlorosulfonated ethylene polymer referred to in the above formulations may be prepared in accordance with the teaching of U. S. Patent 2,212,786, issued August 27, 1940, to McQueen. The polymeric methyl methacrylate may be prepared in accordance with the disclosure in U. S. Patent 1,980,483, issued November 13, 1934 to Hill or by any other known method.

The following examples illustrate embodiments of the invention using combinations of chlorosulfonated ethylene polymer with higher polymeric esters of methacrylic acid. Alkyl esters having up to 8 carbon atoms; i. e., octyl methacrylate make satisfactory coatings for fabrics. Corresponding esters of acrylic acid may be used and substituted in like amount for the methacrylate esters in the examples.

| Example | VI | VII | VIII | IX |
|---|---|---|---|---|
| Chlorosulfonated Ethylene polymer | 100 | 100 | 100 | 100 |
| 50/50 n-butyl/isobutyl methacrylate interpolymer | 25 | | | |
| Polyethyl methacrylate | | 25 | | |
| Polybutyl methacrylate | | | 25 | |
| Polyisobutyl methacrylate | | | | 25 |
| Benzothiazol Disulfide | 1 | 1 | 1 | 1 |
| Wood rosin | 4 | 4 | 4 | 4 |
| Extra Light Magnesium Oxide | 12 | 12 | 12 | 12 |
| Litharge | 4 | 4 | 4 | 4 |
| "Retarder W" (Salicylic Acid plus a dispersing agent) | 1 | 1 | 1 | 1 |
| Toluene | 343 | 343 | 343 | 343 |

All the ingredients of each example save the wood rosin, the polymethacrylic acid ester, and toluene were milled together on a two roll rubber mill. The wood rosin and polymethacrylic acid esters were dissolved in a portion of the toluene and the milled mixture and the balance of the toluene were blended with the solution of wood rosin and the polymethacrylic acid ester to form the base coating composition.

Each composition was spread on separate pieces of textile fabric in the same manner as that described above for Examples I to IV.

The base coated fabrics were then further coated with the calender composition described above in a manner similar to that employed in Examples I to V. After the calender coating operation, the samples were finished in the same manner described above for Examples I to V, except the curing operation was carried out at 280° F. for two hours.

Samples containing the different base coats referred to as Examples VI to IX were then tested for anchorage of the coating to the fabric and mechanical scrub resistance. The results were as follows:

| Example | VI | VII | VIII | IX |
|---|---|---|---|---|
| Adhesion of coating to fabric 1" strip, lbs | 5.5 | 5.6 | 5.6 | 4.9 |
| Scrub | >10,000 | >10,000 | >10,000 | >10,000 |

In the above examples the ratio of polymeric esters of acrylic and methacrylic acids to chlorosulfonated ethylene polymer varies between 20 parts and 40 parts of polymeric methyl methacrylate to each 100 parts of chlorosulfonated ethylene polymer. The preferred ratio is 25 parts of polymeric esters of acrylic or methacrylic acids to 100 parts of chlorosulfonated ethylene polymer.

The preferred embodiment of this invention employs a textile fabric with a base coat comprising polymeric esters of acrylic or methacrylic acids and chlorosulfonated ethylene polymer dispersed in a volatile organic solvent and a second coating of chlorosulfonated ethylene polymer containing no polymeric ester described above superposed over the base coating composition. It is within the scope of this invention to prepare fabrics with improved adhesion of the coating to the fabric and resistance to mechanical scrubbing, in which the entire coating consists of a blend of chlorosulfonated ethylene polymer and polymeric esters of acrylic or methacrylic acids within the range set forth above.

The polymeric esters described above cannot be completely dispersed with other coating ingredients on a two roll rubber mill, and where they are employed with the chlorosulfonated ethylene polymer, it is necessary to prepare a dispersion of the pre-milled ingredients in a volatile organic solvent and then apply a plurality of coats of the coating composition to the surface to be coated by conventional means, such as, e. g., doctor knife, roller, etc. It will be readily apparent to those skilled in the art that the secondary compounding ingredients such as pigments, fillers, accelerators, curing agents, etc. can be varied over a relatively wide range.

The advantages of the coated fabrics produced in accordance with the present invention are the increased adhesion of the coating to the cotton textile fabric and resistance to mechanical scrub.

It is apparent that many widely different embodiments of this invention may be made without departing from the spirit and scope thereof, and therefore, it is not intended to be limited except as indicated in the appended claims.

I claim:

1. A textile fabric base coated with a composition comprising 100 parts of chlorosulfonated ethylene polymer and from 20 to 40 parts of polymeric ester having the formula

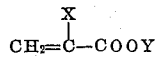

where Y is an alkyl group of 8 carbon atoms or less and X is an H or $CH_3$ group, and a second coating superposed thereover consisting of chlorosulfonated ethylene polymer as the film-forming agent.

2. The product of claim 1 which contains 25 parts of polymeric ester for each 100 parts of chlorosulfonated ethylene polymer.

3. A textile fabric coated with a composition comprising 100 parts of chlorosulfonated ethylene polymer and from 20 to 40 parts of polymeric methyl methacrylate.

4. The product of claim 3 which contains 25 parts of polymeric methyl methacrylate for each 100 parts of chlorosulfonated ethylene polymer.

5. The product of claim 1 in which the polymeric ester is one of methacrylic acid.

6. The process of coating a textile fabric which comprises preparing a composition comprising an intimate mixture of 100 parts of chlorosulfonated ethylene polymer and 20 to 40 parts of polymeric methyl methacrylate, dispersing said mixture in a volatile solvent, applying said composition on a textile fabric heating to evaporate the solvent and further heating to cure the said coating.

7. The process of claim 6 which contains 25 parts of polymeric methyl methacrylate for each 100 parts of chlorosulfonated ethylene polymer.

8. The process of coating a textile fabric which comprises preparing a composition comprising a co-dispersion of 100 parts of chlorosulfonated ethylene polymer and 20 to 40 parts of polymeric methyl methacrylate, applying said composition to the textile fabric, heating to evaporate the solvent, preparing a second coating composition comprising chlorosulfonated ethylene polymer and other compounding ingredients without polymeric methyl methacrylate, applying said second coating over said first coating and heating at an elevated temperature sufficient to cure said coatings.

9. The product of claim 3 in which the coating has the following approximate composition in parts by weight:

| | |
|---|---|
| Chlorosulfonated ethylene polymer | 100 |
| Polymeric methyl methacrylate | 25 |
| Hydroquinone mono benzyl ether | 1 |
| Wood rosin | 4 |
| Magnesium oxide | 12 |
| Litharge | 4 |
| Benzothiazyl disulfide | 1 |
| Salicylic acid plus a dispersing agent | 1 |

ALLAN S. RICHARDSON, Jr.

REFERENCES CITED

The following references are of record in the file of this patent:

UNITED STATES PATENTS

| Number | Name | Date |
|---|---|---|
| 2,319,074 | McGill | May 11, 1943 |
| 2,416,061 | McAlevy et al. | Feb. 18, 1947 |